March 24, 1953 N. L. MAHLA 2,632,207
MOLDING APPARATUS FOR RAPID CYCLE
MOLDING OF THERMOPLASTIC MATERIAL
Filed July 2, 1949 3 Sheets-Sheet 2

INVENTOR.
Neumann L. Mahla,
BY
Escher & Leonard,
his attorneys.

Patented Mar. 24, 1953

2,632,207

UNITED STATES PATENT OFFICE 2,632,207

MOLDING APPARATUS FOR RAPID CYCLE MOLDING OF THERMOPLASTIC MATERIAL

Neumann L. Mahla, Lakewood, Ohio

Application July 2, 1949, Serial No. 102,868

7 Claims. (Cl. 18—17)

This invention relates to a molding apparatus for rapid cycle molding of articles of plastic material and particularly to a new and improved multiple mold apparatus for molding articles of thermoplastic materials in which apparatus the successive heating cycles, molding cycles, and cooling cycles are controlled automatically in response to the temperature of the mold cavities.

Heretofore in the molding of thermoplastic materials the practice has been to control the cycles of operation of the press either in accordance with a definite time interval or in accordance with the judgment of the particular operator.

In the latter instance the operator places the charge of material in the mold and then operates manual controls to introduce the heating medium to the mold and working pressure fluid to the press, maintains the heat and pressure until, in his opinion, the material in the mold has reached the proper temperature, plasticized, and been formed, whereupon he applies the cooling medium until he believes the article is cooled sufficiently, opens the press, removes the article, and repeats the operations. Necessarily the results obtained vary widely with the experience and skill of the particular operator inasmuch as the operator determines the heating and cooling temperatures largely by feeling the exterior of the mold chase.

Because of the wide variations in results obtained in this manner, the heating and cooling cycles have been controlled by suitable timers. These timers, however, control the different cycles in accordance with preselected fixed time intervals. While this type of control eliminates some of the difficulties, nevertheless the results are not uniform due to the fact that the pressure and temperature of the steam and of the cooling water do not remain constant. Furthermore, under varying local conditions in the mold and quality of the material the same time interval does not produce uniform results. To take care of possible variations in material and operating conditions, fixed longer time intervals than would be required under optimum conditions are allowed, thus slowing down the entire cycle of operation.

The apparatus of the present invention is characterized particularly in that the cycles of operation are controlled automatically primarily in response to the temperatures in the mold cavities whereby variations in temperatures and pressures of the steam and the cooling water are compensated for to the extent necessary under the particular conditions existing and the speed of operation of the apparatus as a whole is greatly increased inasmuch as there is no unnecessary time delay in operation of the press after the mold has reached the proper temperatures.

Furthermore, in the present apparatus, the press operates on its closing stroke advantageously during the heating cycle and on its opening stroke immediately upon completion of the cooling cycle, and is readied for the succeeding heating cycle almost immediately upon ejection of a formed article.

The general objects and advantages of the present invention will become apparent from the following description wherein reference is made to the drawings, in which.

Figure 1:
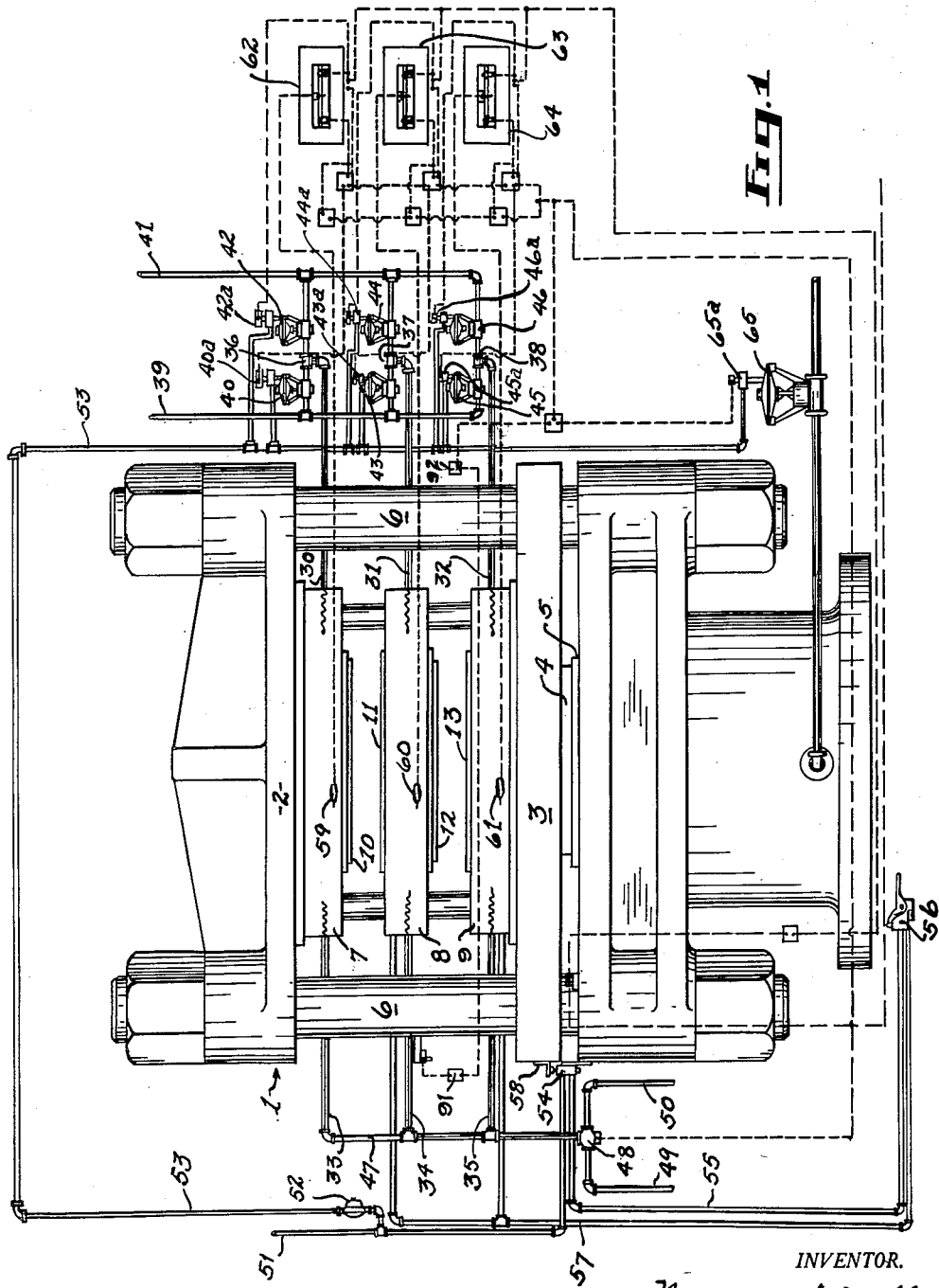
Fig. 1 is a front elevation of apparatus embodying the principles of the present invention, the electrical connection being indicated diagrammatically in single dotted lines only for clearness in illustration.

Referring particularly to Fig. 1, the apparatus includes a press, indicated generally at 1, comprising a rigid frame having a stationary top member 2 and a platen 3 which is movable toward and away from the top member 2 by a suitable hydraulic piston 4 which, in turn, operates in a hydraulic cylinder 5 in the base of the press. The usual guide posts 6 are provided for maintaining the platen 3 and the cooperating pressure member 2 in alignment with each other. For purposes of illustration the press is shown in conjunction with a stack mold including an upper chase 7, a middle chase 8, and a lower chase 9. The mold described and claimed in my copending application Serial No. 102,869, filed July 2, 1949, is very desirable in connection with the present apparatus.

Figure 2:
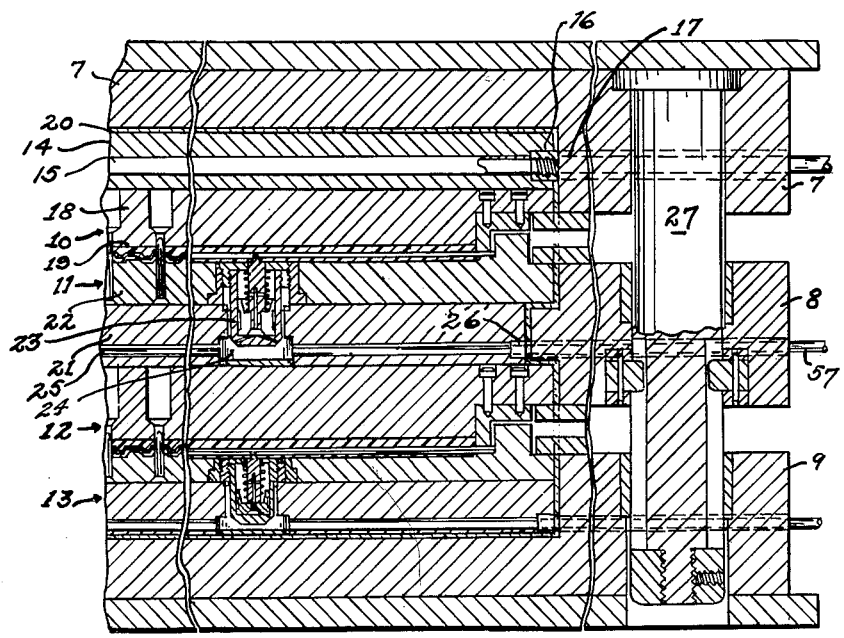
Fig. 2 is a fragmentary vertical sectional view through a stack mold assembly used in connection with the present invention and is taken as indicated by line 2—2 of Fig. 3.

As therein more fully described, and as illustrated in Fig. 2, the upper chase carries a top mold section 10, the middle chase 8 carries a bottom mold 11 cooperable with the mold section 10 and a top mold section 12 cooperable with a bottom mold section 13 which is carried in the lower chase 9. The mold is preferably arranged as a subassembly which may readily be interposed between the stationary pressure member 2 and the movable platen 3 of the press.

For the purpose of brevity only the upper mold of the stack is described in detail herein. In the chase 7 there is mounted a heat exchange plate 14 which preferably is of copper beryllium alloy cast about a steel tube 15. The tube, as will later be described, is preferably arranged in a serpentine form so as to define a horizontal pattern approximately the same as the projected horizontal pattern of the cavity. The tube 15 is provided at its ends with internally threaded fittings 16 and the chase 7, and the other chases, are provided with suitable bores 17 through which pipes of an external piping system may be inserted and screw connected to the ends of the tube 15, respectively. A cavity plate 18 is mounted in juxtaposition with the heat exchange plate 14 and is provided with a downwardly facing molding or cavity portion 19. The heat exchange plate and the juxtaposed cavity plate are insulated from the chase 7 by a suitable insulating material 20 which may be laminated stainless steel. The lower section 11 is similarly arranged and comprises a heat exchange plate 21 which is carried in the chase 8 and a juxtaposed cavity plate 22. Since a lower mold section 12 is carried on the chase 8, the cavity plate 22 and heat exchange plate 21 are insulated from the chase 8 only about their periphery so that heat may be transferred from the heat exchange plate 21 both to the lower mold section 11 and the upper mold section 12 of the mold therebeneath in the stack.

Figure 3:
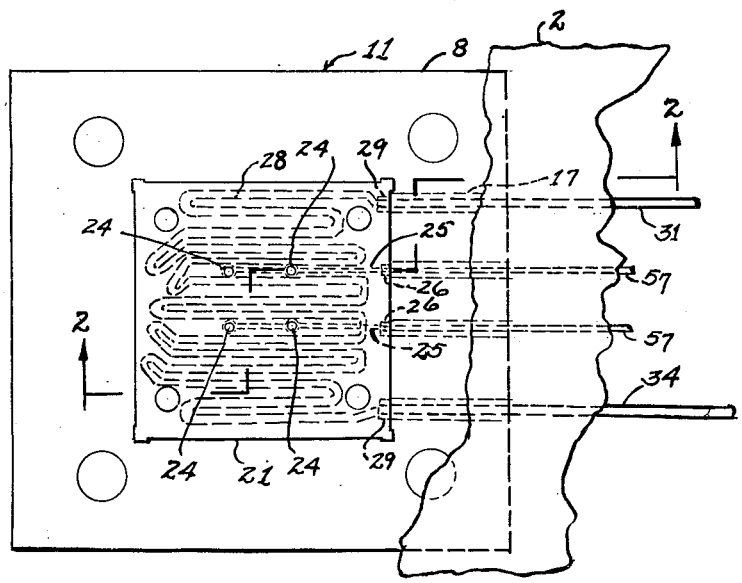
Fig. 3 is a top plan view of a portion of one of the molds of the stack used in the present apparatus.

The lower mold section 11 is provided with air operated ejectors 23, each of which is adapted to operate on its ejecting stroke upon the admission of air thereto and to be returned by resilient means to starting position when the ejector is disconnected from the source of air pressure and connected to the atmosphere. The ejector is such as described in my copending application Serial No. 102,870, filed July 2, 1949. As therein more fully described the ejector is provided with a by-pass passage by means of which, upon initiation of the ejecting stroke, part of the air under pressure admitted to the ejector is by-passed into the cavity of the mold beneath the article therein closely adjacent the area of the article engaged by the ejector. The by-pass is so arranged that upon disconnecting the ejector from the source of air under pressure and connecting it to the atmosphere the gases evolved in the mold during the molding operation are vented through the ejector. In order to connect the ejector to a source of air and to the atmosphere, selectively, the heat exchange plate 21 is provided with cavities 24 which in turn connect with pipes 25 which are cast into the heat exchange plate 21 and have internally threaded fittings 26 which are adapted for screw connection with pipes of an external air piping system which are inserted through suitable bores in the chase 8, as illustrated in Fig. 3. The chases 7, 8, and 9 are maintained in proper alignment by suitable guide posts 27. The heat exchange plate 21 also is provided with a tube 28 which is bent in serpentine form so as to define a pattern substantially the same as that of the projected pattern of the mold cavity and is so arranged that the heat exchange is effected as near uniformly as possible over the entire pattern. The tube 28 is provided with fittings 29 similar to the fittings 16 and the chase 8 is provided with suitable bores 17, as mentioned, through which the external pipes may be inserted and connected to the ends of the tube 28, respectively. The mold section 12 is similar to the mold section 10 and the lower mold section 13 of the chase 9 is similar to the mold section 11 of the chase 8.

For convenience in illustration, the opposite ends of the embedded tubes in the various mold sections are shown in Fig. 1 as being at opposite ends of the mold sections, and, in fact, they may be so arranged but preferably they are arranged to extend out of the mold sections at the same side as illustrated in Fig. 3. Each of the tubes for carrying the heating and cooling media is connected at one end to an inlet pipe and at the opposite end to a discharge pipe. The inlets to the tubes for the heating and cooling media in the mold sections of the chases 7, 8, and 9, respectively, are connected to pipes 30, 31, and 32, respectively. The inlets of the pipes 30, 31 and 32 are connected respectively to T-connections 36, 37, and 38. The pipe 30 is connected to a source of cooling water which is preferably refrigerated and which is supplied by a pipe 39, an air operated control valve 40 being interposed between the pipe 39 and the T-connection 36. Steam is supplied to the pipe 30 from a suitable pipe 41 through an electrically controlled air operated valve 42 which is at the opposite side of the T-connection 36 from the valve 40. Correspondingly the line 31 is connected to the source of cold water and the source of steam, respectively, by air operated valves 43 and 44 and the line 32 is similarly connected by air operated valves 45 and 46. The air operated valves 40, 42, 43, 44, 45, and 46 are operated by solenoid controlled air valves 40a, 42a, 43a, 44a, 45a, and 46a, respectively. Thus each of the pipes 30, 31 and 32 may be connected selectively to the source of cold water or to the source of steam by means of the associated valves. The outlet pipes 33, 34, and 35 are connected to a common pipe 47 which in turn is connected to a two-way discharge valve 48 from one side of which a pipe 49 provides a steam return and from the other side of which a pipe 50 provides a cold water return, so that the valve 48 is operative to connect the line 47 to the steam return pipe 49 which is trapped and to the cold water return pipe 50, respectively.

Air under about ninety pounds pressure is supplied from a suitable source through a pipe 51. The pipe 51 is connected through a reducer 52 to a pipe 53 to which air is supplied from the reducer at about forty pounds pressure. The pipe 53 is connected by suitable branches to each of the valves 40a, 42a, 43a, 44a, 45a, and 46a, the operative connection of the valves to the air being controlled by suitable electric switches and solenoid operating means later to be described.

The air supply line 51 also is connected to one side of a two-way valve 54, the opposite side of which is connected to a pipe line 55 which leads to one side of foot operated two-way air valve 56. The opposite side of the valve 56 is connected by a pipe 57 to the air supply tubes of the ejectors in the molds of the chases 8 and 9.

For example, referring to the mold in Fig. 3, the tube 28 is connected at its inlet end to the pipe 31 and at its outlet end to the pipe 34 and the air supply tubes 25 are connected at their inlet ends to the pipe 57. The valve 54 in the air line is engaged by a suitable cam 58 so positioned as to operate the valve 54 to connect the line 51 to the line 55 when the press is fully open and to release the valve, which is self-closing, when the press is not fully open. Thus only when the press is fully open is the foot operated treadle 56 operative to control the admission of air to the ejectors. Consequently when the press starts opening the operator can depress the foot treadle but no ejection will occur until the molds are fully open. The foot treadle 56 is normally vented to the outside air. Consequently gases evolved in the molds can escape through the ejectors and pipe 55 to the atmosphere through the foot treadle.

By virtue of the electrical controls air or cold water can be admitted selectively to the molds through the pipes 30, 31 and 32. As mentioned, the operation of the apparatus is controlled as near as may be by the temperatures in the mold cavities. For this purpose temperature responsive devices such as thermocouples are provided in the molds and arranged as near as may be to the respective cavities so that their temperature is as nearly indicative of the temperature in the mold cavities as possible. In the form illustrated, three thermocouples designated 59, 60, and 61 are provided, the hot junction of the thermocouple 59 being arranged adjacent the cavity plate 22 of the top mold section, the hot junction of the thermocouple 60 being arranged between and common to the cavity plates of the central mold sections 11 and 12 and the hot junction of the thermocouple 61 being arranged adjacent the cavity plate of the mold section 13. The thermocouples are shown near the centers of the associated molds. However, since there are often some variations in the amount of steam and the amount of cool water supplied to the different mold sections, due to obstructions in the lines, flow characteristics, valve operations and the like, the thermocouples are not necessarily placed in the same relation to the mold pattern in each of the molds. It has been found desirable to provide a diagonal channel in each mold plate in which the associated thermocouple is inserted and moved back and forth until the temperature conforming most nearly to that desired in the mold cavity results. For example, a few tests of the temperature in a given mold cavity indicates the temperature therein for a a given reading of the thermocouple, so that the control can be set accordingly. When a fixed relation between the temperature indicated by the thermocouple and that obtained in the cavity is obtained throughout a range from maximum heating to maximum cooling temperature, the thermocouple is then secured in the position in which this relation was obtained and thereafter operates in such position, the controls responsive to the thermocouples being set accordingly. The thermocouples 59, 60, and 61 are connected to well-known types of controls 62, 63, and 64, respectively, later to be described.

As more fully described in connection with Fig. 4, the operation of the apparatus is as follows: Air from the line 53 is supplied to an air valve 65a for operating a valve 65 which controls the connection and disconnection of the main hydraulic cylinder of the press with the source of operating pressure fluid, the admission of air to the valve 65a being controlled by a suitable starting switch later to be described.

Assuming that the press is open the operator charges the molds with material to be molded. He operates a pair of push buttons, operating a circuit which opens the steam valves to heat the molds and the press starts on the closing stroke. The press continues on this stroke, the molds heating meanwhile to a plasticizing temperature, for example, of about 380° Fahrenheit. The press continues closing until the molds are fully closed and the pressure is applied to the material therein. The plasticizing temperature is reached either during closure or shortly thereafter. As is later explained, the thermocouples are interrelated so that they cannot initiate operation of the circuit to cool the molds until all of the mold cavities are at a sufficiently high temperature to plasticize the material. When all molds are thus properly heated, the thermocouples initiate operation of the electrical circuit causing the steam inlet valves to close and the cold water valves to open. Concurrently the circuit causes the two-way valve 48 to become disconnected from the steam return pipe 49 and to become connected to the water return line 50. Thereupon cool water is passed through the tubes in the heat exchange plates of the molds until the temperature in all of them has dropped below a predetermined cooling temperature, for example, below 100° Fahrenheit. When all molds have cooled, the thermocouples operate the circuit to cause the press to open. Only when all of the molds have cooled sufficiently can the press open. As soon as the press begins to open, the water valves close and the steam valves open and the discharge lines from the molds are connected to the water return line 49 by the valve 48. Thus the steam initially introduced following the cooling period and the resulting condensation from the water are blown out of the molds into the water return line during the opening of the press. When the press reaches the open position, the valve 48 connects the discharge lines 33, 34 and 35 of the molds to the steam return line and the reheating cycle begins. Upon operation or depression of the treadle while the press is open, air is admitted to the ejectors and the articles are ejected both mechanically and by pneumatic pressure. During these operations, until the treadle controlled valve has been operated to eject the articles, the mold cavities have been vented to the atmosphere through the ejectors 23, tubes 25, air line 57, and the treadle operated valve 56.

By the time the operator has removed the ejected article and cleaned the mold, the mold is heated sufficiently so that another charge of material can be placed in the mold and the press again started immediately on its closing stroke. As mentioned, all of the thermocouple controls are interconnected and interlocked so that the press cannot be opened until all of the cavities have been cooled to the predetermined lower temperature necessary for setting the material.

Also, as appears from the discussion of the wiring diagram hereafter, each of the steam and cold water valves is operated by its individual thermocouple and each mold is brought to the required temperature, even though the time interval for each may vary to some extent due to the extraneous causes such as differentials in the flow of steam or cold water admitted to the molds due to the respective configurations or flow characteristics of the pipes, valves, and the like.

As a result, the molding of each article is effected at the proper temperatures even though a plurality of stack molds are used, and the cycling of the apparatus is coordinated and controlled automatically in accordance with the mold cavity temperatures so that no appreciable time is lost and a relatively high rate of production of articles of uniform quality is maintained.

Figure 4:
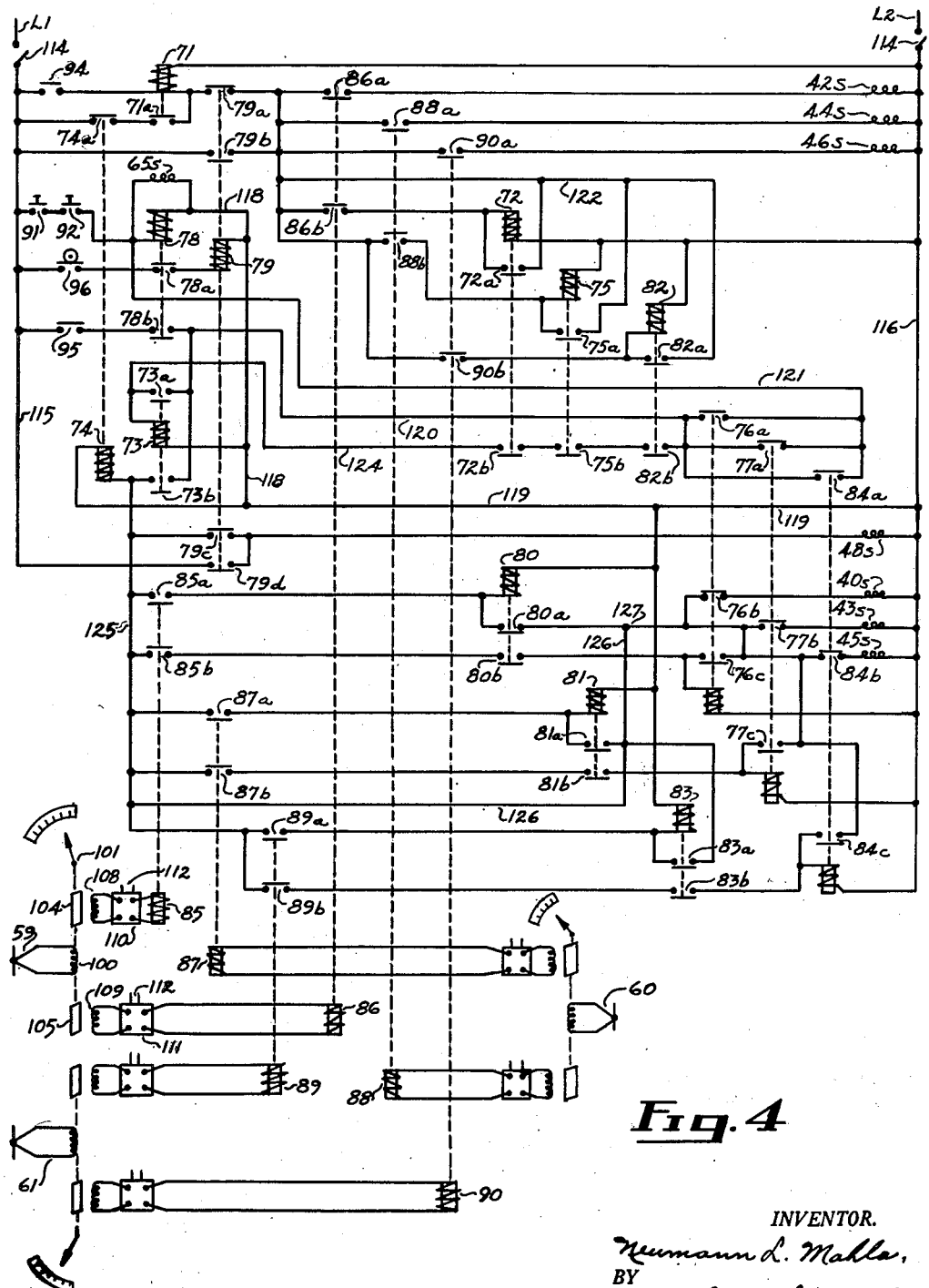
Fig. 4 is a wiring diagram illustrating the electrical control for the apparatus.

Referring next to the electrical control system of Fig. 4, by which the cycles of the apparatus are made responsive to the thermocouples, Fig. 4 shows a plurality of electromagnetic relays 71 through 90 arranged to provide the desired press operating sequence automatically. Each of the relays 71 through 90 has an operating winding and one or more contacts, the contacts being indicated by the reference numeral of the relay followed by a small letter such as a, b, c, or d. The relay 71 has one normally open contact, each of the relays 72, 73 75, 80, 81, 82 and 83 has two normally open contacts, the relay 74 has one normally closed contact, each of the relays 76, 77, and 84 has one normally open and two normally closed contacts, each of the relays 78, 85, 86, 87, 88, 89, and 90 has one normally open and one normally closed contact, and the relay 79 has two normally closed and two normally open contacts.

Series connected push buttons 91 and 92 mounted on opposite sides of the press (Fig. 1) are arranged to initiate the operating cycle. A limit switch 94 is closed by the platen 3 when the press is open and is open at all other times. A similar limit switch 95 is closed by the platen 3 when the press is closed and is open at all other times. During opening movement of the press a normally open cam actuated limit switch 96 closes momentarily.

The air operated steam valves 42, 44, and 46 are controlled by air valves 42a, 44a, and 46a (Fig. 1) having operating solenoids 42s, 44s, and 46s (Fig. 4), respectively. Similarly, the air operated water valves 40, 43, and 45 (Fig. 1) are controlled by air valves 40a, 43a, and 45a having operating solenoids 40s, 43s, and 45s (Fig. 4), respectively, and the air operated hydraulic valve 65 is controlled by an air valve 65a having an operating solenoid 65s. The discharge valve 48 is directly controlled by a solenoid 48s.

The relays 85 and 86 are arranged to be responsive to the temperature of the thermocouple 59, the relays 87 and 88 are arranged to be responsive to the temperature of the thermocouple 60, and the relays 89 and 90 are arranged to be responsive to the temperature of the thermocouple 61. Any suitable amplifying means may be interposed between the thermocouples and their respective relays. As shown, temperature indicating amplifiers of the well known oscillator type are utilized to provide the desired degree of amplification, the relays 85 through 90 preferably being of the microswitch type. Since the amplifiers associated with each thermocouple are identical, a description of one will suffice.

The thermocouple 59 is arranged to supply energy to a meter-type coil 100 rotatably supported in a magnetic field for moving a temperature indicator or pointer 101 across a calibrated scale 102. Each of a pair of metal control flags 104 and 105 mounted on the shaft of the coil 100 is free to pass into and out of the field of pick-up coils 108 and 109, respectively, adjustably positioned at selective control points in the path of movement of the respective flags by means of a temperature setting index (not shown). The flags may be of iron or other metal. The pick-up coils 108 and 109 are supplied with high frequency energy from oscillators 110 and 111, respectively, which also supply the operating windings of the relays 85 and 86, respectively. The oscillators 110 and 111 may be energized from a suitable source of low frequency indicated at 112.

If the temperature of the thermocouple 59 is below a selected hot value, the flag 105 is wholly or partly withdrawn from the field of the pick-up coil 109 and the oscillator 111 maintains the relay 86 in its energized position. When the temperature of the thermocouple 59 increases, the pointer 101 moves across the scale 102 and the flag 105 moves into the center of the field of the coil 109, whereupon the oscillatory energy of the oscillator 111 falls causing the relay 86 to return to its normal deenergized position as shown.

Similarly, if the temperature of the thermocouple 59 is above a selected cold value, the flag 104 is wholly or partly withdrawn from the field of the pick-up coil 108 and the oscillator 110 maintains the relay 85 in its energized position. When the temperature of the thermocouple 59 decreases, the pointer 101 moves across the scale 102 and the flag 104 moves into the center of the field of the coil 108, whereupon the oscillatory energy of the oscillator 110 falls causing the relay 85 to return to its normal deenergized position as shown.

The relay 85 is thus a "cold" control relay and the relay 86 is a "hot" control relay. The relays 87 and 89 are "cold" control relays associated with the thermocouples 60 and 61, respectively, and the relays 88 and 90 are "hot" control relays associated with the thermocouples 60 and 61, respectively.

When it is desired to operate the press, all of the oscillators are connected to the source 112 and begin to heat. When the oscillators have reached their operating temperature, a double pole knife switch 114 may be closed connecting a suitable source indicated at L1 and L2 to conductors 115 and 116. If desired the source L1—L2 may be the same as the source 112.

The press is not hot at this time so that the relays 86, 88, and 90 are moved to their energized positions. Since the press is open, the limit switch 94 is closed connecting the operating winding of the relay 71 across the conductors 115 and 116. The contacts 71a close and complete an energizing circuit for the solenoid 42s of the air valve 42a through the normally closed contacts 74a and 79a and the now closed contacts 86a. The contacts 71a also complete parallel circuits through the now closed contacts 88a and 90a to the solenoids 44s and 46s, respectively. A holding circuit for the operating winding of the relay 71 around the limit switch 94 is also completed by the contacts 71a through the contacts 74a. Energization of the solenoids 42s, 44s, and 46s causes opening of the air valves 42a, 44a, and 46a and consequent opening of the stream valves 42, 44, and 46. Steam is now admitted to heat the press.

After the press is loaded, the operator closes the push buttons 91 and 92 which completes an energizing circuit for the solenoid 65s of the valve 65 from the conductor 115 through the push buttons 91 and 92, the solenoid 65s, and conductors 118 and 119 to the conductor 116. The valve 65 then operates to close the press. The operating winding of the relay 78 is connected directly in parallel with the solenoid 65s and the relay 78 opens its contacts 78a and closes its contacts 78b. Opening of the contacts 78a prevents completion of a circuit to the relay 79 during closing movement of the press.

When the press is fully closed, the limit switch 95 closes to complete a by-pass circuit around the push buttons 91 and 92 through the now closed contacts 78b, a conductor 120, the normally closed contacts 76a, 77a, and 84a in parallel, and a conductor 121 to the solenoid 65s and the operating winding of the relay 78. The push buttons 91 and 92 may be released and the press remains closed and steam continues to be applied to heat the molds. When the top cavity plate 22 reaches the desired pre-set temperature, the thermocouple 59 causes the coil 100 to turn the flag 105 into the field of the coil 109 and the relay 86 returns to its normal position opening its contacts 86a and closing its contacts 86b. Opening of the contacts 86a causes the steam valve 42 to close shutting off the flow of steam to the upper chase 7, and closure of the contacts 86b completes an operating circuit for the relay 72. The relay 72 thereupon closes its contacts 72a to complete a holding circuit for itself around the contacts 86b and closes its contacts 72b in a circuit to be described.

Similarly, when the cavity plates of the central mold sections 11 and 12 reach the desired pre-set temperature, the thermocouple 60 effects deenergization of the relay 88, and, when the cavity plate of the mold section 13 becomes heated to the selected degree, the thermocouple 61 effects deenergization of the relay 90. Dropout of the relays 88 and 90 effects closure of the air valves 44a and 46a and consequent closure of the steam valves 44 and 46 to terminate the heating cycle. Closure of the contacts 88b and 90b completes operating circuits for the relays 75 and 82, respectively, which close their respective contacts 75a and 82a to complete self holding circuits through a conductor 122. The contacts 75b and 82b also close.

Only when all three of the "hot" relays 86, 88, and 90 are deenergized are all three of the relays 72, 75, and 82 energized. As soon as the last of the relays 72, 75, and 82 is closed, an operating circuit for the relay 73 is completed from the conductor 115, the now-closed limit switch 95, the now-closed contacts 78b, the conductor 120, the contacts 82b, 75b, and 72b, a conductor 124, the operating winding of the relay 73, and the conductors 118 and 119 to the conductor 116. The contacts 73a thereupon close to complete a holding circuit for the relay 73 around the contacts 72b, 75b, and 82b, and the contacts 73b close to connect a conductor 125 to the conductor 115 through the contacts 78b and the limit switch 95. The system is now set up for functioning of the "cold" control relays.

Closure of the contacts 73b completes an obvious energizing circuit for the relay 74 which opens its contacts 74a in the feed from the conductor 115 to the solenoids 42s, 44s, and 46s thus insuring that the valves 42, 44, and 46 do not reopen when the relays 86, 88, and 90 become energized again as the press cools.

As soon as the conductor 125 is connected to the conductor 115, operating circuits are completed to the solenoids 40s, 43s, 45s, and 48s, and for the relays 80, 81, and 83. The circuit for the solenoid 40s is completed through conductors 126 and 127 and the normally-closed contacts 76b. The circuit for the solenoid 43s is completed from the conductor 127 through the normally-closed contacts 77b and the circuit for the solenoid 45s is completed from the conductor 127 through the normally closed contacts 84b. The circuit for the solenoid 48s is through the normally-closed contacts 79c. The circuits to the operating windings of the relays 80, 81, and 83 are completed from the conductor 125 through the now-closed contacts 85a, 87a, and 89a, respectively, the relay windings being connected to the conductor 116 through the conductor 119. The relays 80, 81, and 83 are held in their picked-up positions through the now-closed contacts 80a, 81a, and 83a, respectively, from the conductor 126 against subsequent opening of the contacts 85a, 87a, and 89a, respectively.

Energization of the solenoids 40s, 43s, and 45s operates the air valves 40a, 43a, and 45a which in turn causes opening of the water valves 40, 43, and 45. At the same time, the valve 48 is operated by energization of the solenoid 48s to connect the discharge lines 33, 34, and 35 to the water return line 50. The press now starts to cool.

When the upper mold reaches a low temperature predetermined by adjusting the position of the pick-up coil 108, the flag 104 enters into the field of the coil 108 and the relay 85 drops out opening its contacts 85a and closing its contacts 85b. Closure of the contacts 85b completes a circuit from the energized conductor 125 through the now closed contacts 80b, and the winding of the relay 76 to the conductor 116. The contacts 76c then close to complete a holding circuit for the winding of the relay 76 through the conductors 126 and 127, the contacts 76b open to deenergize the solenoid 40s permitting the water valve 40 to reclose, and the contacts 76a open for a purpose to be described.

Similarly as the intermediate and lower molds become cooled to the predetermined degree, the relays 87 and 89 drop out to complete, through their contacts 87b and 89b, respective energizing circuits for the relays 77 and 84. Pick-up of the relays 77 and 84 completes self-holding circuits through the contacts 77c and 84c and opens the circuits to the solenoids 43s and 45s at the contacts 77b and 84b, respectively. The valves 43 and 45 reclose upon deenergization of solenoids 43s and 45s so that cooling water is no longer supplied to any of the molds.

When the last of the three relays 76, 77, and 84 picks up, which may be in any sequence or simultaneously, all of the parallel connected contacts 76a, 77a, and 84a are open and the previously traced holding circuit to the operating winding of the relay 78 and the solenoid 65s is interrupted. Deenergization of the solenoid 65s operates the hydraulic valve 65 and the press starts to open. Thus only after all of the thermocouples 59, 60, and 61 have indicated that all of the molds have reached the desired low temperatures is it possible for the press to be opened, and, when the desired low temperatures are reached, the press opens automatically.

During opening movement of the press, the cam operated limit switch 96 closes completing a circuit for the relay 79 from the conductor 115 through the contacts 96 and 78a, the winding of the relay 79, and the conductors 118 and 119 to the conductor 116. When the press started to cool, the contacts 86a, 88a, and 90a reclosed, and closure of the contacts 79b now completes circuits to the solenoids 42s, 44s, and 46s which respond to open the steam valves 42, 44, and 46 readmitting steam to the press. Closure of the contacts 79d maintains the solenoid 48s energized and the steam drives the water into the water return line 50. At the bottom of the opening stroke, the cam operated limit switch 96 opens and the relay 79 drops out opening its contacts 79d. Since when the upper limit switch opened at the start of the opening cycle, the relays 73 and 74 were deenergized, opening of the contacts 79d interrupts the last remaining circuit to the solenoid 48s and the valve 48 connects the several press discharge lines to the main steam discharge line 49.

When the press reaches its open position, the limit switch 84 closes to complete a circuit through the normally closed contacts 79a to the steam valve solenoids 42s, 44s, and 46s. The relay 71 responds as before and steam is applied to start the heating cycle while the operator is using the air line to eject the material as previously described.

Having thus described my invention, I claim:

1. In a molding apparatus, a press, power means for opening and closing the press, selectively, a mold operable by the press, fluid pressure operated ejector means for the mold, manually controlled valve means operable selectively to connect said ejector with and disconnect the ejector means from a source of fluid pressure, and means rendered operative when the press is open to render the valve means operable selectively, and upon predetermined movement of the press from open position to render the valve means inoperable to connect the ejector means to said source.

2. In a molding apparatus including a press, power means for opening and closing the press, selectively, a mold operable by the press, said mold having a gas vent leading into the mold cavity, manually controlled valve means operable selectively to connect the vent to a source of air under pressure and to disconnect the vent from said source and connect it to the atmosphere, means rendered operative when the press is open to render the valve means operable selectively, and upon predetermined movement of the press from open position to render the valve means operative to connect the said vent to the atmosphere.

3. In a molding apparatus, a press, power means for opening and closing the press, selectively, a plurality of molds operable by the press, control means respective to the molds, each control means being operable to admit heating and cooling media to its individual mold, selectively, thermally responsive means respective to the molds, and each thermally responsive means being operative to control said control means of its individual mold, means operatively interconnecting said thermally responsive means with each other and to the power means and rendered operative by the thermally responsive means when the mold of any one of the thermally responsive means is below its predetermined temperature, to render its respective control means inoperative to admit cooling fluid, and rendered operable by the thermally responsive means when the mold of any one of the thermally responsive means is above its predetermined cooling temperature to render the power means inoperable to open the press.

4. In a molding press having a plurality of molds, means for closing the press and for maintaining the press closed, means for supplying heating energy to the molds, means for cooling the molds, thermal responsive means respective to the molds for discontinuing the supply of heating energy to the respective molds when the respective molds reach a predetermined high temperature, cooling control means rendered operative by said thermal responsive means only when all of said molds are at said high temperature for rendering said cooling means operative, said thermal responsive means including means for rendering said cooling control means operative when the respective molds reach a predetermined low temperature to discontinue operation of said cooling means, and press opening control means rendered operative by said thermal responsive means only when all of said molds are at said predetermined low temperature for disabling said maintaining means and opening said press.

5. The combination of claim 4 characterized in that said closing and maintaining means and said cooling control means are electroresponsive and in that said thermal responsive means includes a plurality of series connected relay contacts operative when all are closed to complete an operating circuit to said cooling control means for rendering said cooling means operative and further includes a plurality of parallel connected relay contacts operative when all are open to disable said maintaining means.

6. The structure of claim 4 characterized in that said molds are adapted to be heated by heating energy in the form of fluid media, each mold has a passage through which heating media and cooling media are circulated during heating and cooling, respectively, connecting means are provided for connecting said passages to an exhaust to permit blowing out of said passages between cooling and heating, and means are provided which are rendered operative while the press is moving a predetermined distance toward open position for rendering said connecting means temporarily operative and for concurrently connecting the passage to a source of heating media.

7. The structure of claim 4 characterized in that means are provided which are rendered operative upon predetermined opening of the press to reinitiate the operation of said means for supplying heating energy.

NEUMANN L. MAHLA.

REFERENCES CITED

The following references are of record in the file of this patent:

UNITED STATES PATENTS

| Number | Name | Date |
| --- | --- | --- |
| 1,030,408 | Jegge | June 25, 1912 |
| 2,128,417 | Kerr | Aug. 30, 1938 |
| 2,356,406 | Hislop | Aug. 22, 1944 |
| 2,373,201 | Smith | Apr. 10, 1945 |
| 2,432,215 | Stocker | Dec. 9, 1947 |
| 2,495,228 | Berry | Jan. 24, 1950 |
| 2,521,232 | Butler | Sept. 5, 1950 |